(12) United States Patent
Nishio et al.

(10) Patent No.: US 6,937,920 B2
(45) Date of Patent: Aug. 30, 2005

(54) METAL SHEET PART BENDING ORDER AND BENDING DIE PROPOSING DEVICE AND PROPOSING METHOD

(75) Inventors: Hisashi Nishio, Isehara (JP); Yasuyuki Nakayama, Isehara (JP)

(73) Assignee: Amada Co., Ltd., Kanagawa (JP)

( * ) Notice: Subject to any disclaimer, the term of this patent is extended or adjusted under 35 U.S.C. 154(b) by 224 days.

(21) Appl. No.: 10/362,684

(22) PCT Filed: Aug. 29, 2001

(86) PCT No.: PCT/JP01/07424

§ 371 (c)(1),
(2), (4) Date: Mar. 4, 2003

(87) PCT Pub. No.: WO02/20191

PCT Pub. Date: Mar. 14, 2002

(65) Prior Publication Data

US 2004/0093921 A1 May 20, 2004

(30) Foreign Application Priority Data

Sep. 5, 2000 (JP) ..................... 2000-269410

(51) Int. Cl.$^7$ ............................. G06F 19/00
(52) U.S. Cl. .................. 700/165; 700/97; 700/104; 70/420
(58) Field of Search .............. 700/97, 104, 165; 72/250, 414, 420; 345/964–967

(56) References Cited

U.S. PATENT DOCUMENTS 5,822,207 A * 10/1998 Hazama et al. .............. 700/97
5,969,973 A * 10/1999 Bourne et al. .............. 700/165
6,098,435 A * 8/2000 Takada ...................... 72/31.11
6,243,611 B1 * 6/2001 Hazama et al. ............. 700/97
6,341,243 B1 * 1/2002 Bourne et al. .............. 700/165
6,539,399 B1   3/2003 Hazama et al.

FOREIGN PATENT DOCUMENTS

| EP | 955105 | 8/1997 |
| JP | 63154218 | 6/1988 |
| JP | 6-142768 | 5/1994 |
| WO | 9615481 | 5/1996 |

OTHER PUBLICATIONS

English Language Abstract of JP Appln. No. 6–142768.
English Language Abstract of JP Appln. No. 63–154218.

* cited by examiner

*Primary Examiner*—Leo Picard
*Assistant Examiner*—Douglas S. Lee
(74) *Attorney, Agent, or Firm*—Greenblum & Bernstein, P.L.C.

(57) ABSTRACT

A bending sequence and bending die proposing apparatus for a sheet metal part, includes: means for storing a development drawing of the sheet metal part; means for detecting a plurality of bending sequence candidates capable of manufacturing the sheet metal part, and bending die candidates to be used in the respective bending steps in the respective bending sequence candidates, based on the development drawing; and means for displaying the plurality of bending sequence candidates. The display includes information representing the number of stages in the respective bending sequence candidates.

17 Claims, 11 Drawing Sheets

METAL SHEET PART BENDING ORDER AND BENDING DIE PROPOSING DEVICE AND PROPOSING METHOD

TECHNICAL FIELD

The present invention relates to a bending sequence and bending die proposing apparatus which proposes a bending sequence and bending die for a sheet metal part and to a method thereof.

BACKGROUND ART

Various kinds of inventions have been heretofore made relating to in which order each bend line of a sheet metal part having a complicated shape is bent, and which die is to be used for bending each bend line.

For example, a method for automatically determining a bending sequence and a bending die to be used for each bending by cost calculation or heuristically by giving constraint or cost with respect to a plurality of bend lines, is described in a publication specification laid-open of international patent application WO96/15481.

In this method, however, only one bending sequence and one bending die to be used for respective bending in the bending sequence, which are considered to be most suitable by a computer, are determined. The determined bending sequence and bending die in the bending sequence may be the most suitable bending sequence and bending die, to the best of recognition of the computer.

However, such a solution may not suit in a site such as a bending factory, or may not be most suitable.

The present invention has been achieved in order to solve the above problem, and it is an object of the present invention to provide an apparatus or method, which can optimally determine a bending sequence and a bending die for a sheet metal part having a bent portion, adapted for a site in a bending factory, or in accordance with specific circumstances in the site.

DISCLOSURE OF THE INVENTION

In order to achieve the above object, the bending sequence and bending die proposing apparatus for a sheet metal part of the present invention based on a first aspect includes: means for storing a development drawing of the sheet metal part; means for detecting a plurality of bending sequence candidates capable of manufacturing the sheet metal part, and bending die candidates to be used in the respective bending steps in the respective bending sequence candidates, based on the development drawing; and means for displaying the plurality of bending sequence candidates, wherein the display includes information representing the number of stages in the respective bending sequence candidates.

The bending sequence and bending die proposing apparatus for the sheet metal part according to the present invention based on a second aspect further comprising means for storing the held tools, based on the apparatus according to the first aspect.

The bending sequence and bending die proposing apparatus for the sheet metal part according to the present invention based on a third aspect further comprising means for storing selection priority of the tool to be used, based on the apparatus according to the first aspect or the second aspect.

The bending sequence and bending die proposing apparatus for the sheet metal part according to the present invention based on a fourth aspect further comprising means for storing a priority item, based on the apparatus according to any one of the first to the third aspects.

In the bending sequence and bending die proposing apparatus for the sheet metal part according to the present invention based on a fifth aspect, the priority item is any one of the minimum number of stages, minimum number of inversion, and minimum number of rotations, in the apparatus according to the fourth aspect.

In the bending sequence and bending die proposing apparatus for the sheet metal part according to the present invention based on a sixth aspect, the detection of the bending sequence candidates and the bending die candidates is executed based on the information of held tools or priority information of the tool to be used, in the apparatus according to any one of the first to the fifth aspects.

In the bending sequence and bending die proposing apparatus for the sheet metal part according to the present invention based on a seventh aspect, the display includes at least any one of the information representing the number of setup (number of arrangements), the number of inversion, and the number of rotations, in the respective being order candidates, in the apparatus according to any one of the first to the sixth aspects.

In the bending sequence and bending die proposing apparatus for the sheet metal part according to the present invention based on an eighth aspect, the display includes information representing the total turning angle in the respective bending sequence candidates, in the apparatus according to any one of the first to the seventh aspects.

In the bending sequence and bending die proposing apparatus for the sheet metal part according to the present invention based on a ninth aspect, the display is displayed in order of the minimum number of stages, minimum number of inversion, or minimum number of rotations, in the apparatus according to any one of the fifth to the eighth aspects.

A bending sequence and bending die proposing method for a sheet metal part according to the present invention based on a tenth aspect includes: a step of receiving a development drawing of the sheet metal part; a step of detecting a plurality of bending sequence candidates capable of manufacturing the sheet metal part, and bending die candidates to be used in the respective bending steps in the respective bending sequence candidates, based on the development drawing; and a step of displaying the plurality of bending sequence candidates, wherein the display includes information representing the number of stages in the respective bending sequence candidates.

The bending sequence and bending die proposing method for the sheet metal part according to the present invention based on an eleventh aspect further comprising a step of storing the held tools, based on the method according to the tenth aspect.

The bending sequence and bending die proposing method for the sheet metal part according to the present invention based on a twelfth aspect further comprising a step of storing selection priority of the tool to be used, based on the method according to the tenth aspect or the eleventh aspect.

The bending sequence and bending die proposing method for the sheet metal part according to the present invention based on a thirteenth aspect further comprising a step of storing any one of priority items of the minimum number of stages, minimum number of inversion, and minimum number of rotations, based on the method according to any one of the tenth to the twelfth aspects.

In the bending sequence and bending die proposing method for the sheet metal part according to the present invention based on a fourteenth aspect, the detection of the bending sequence candidates and the bending die candidates is executed based on the information of held tools or selection priority information of the tool to be used, in the method according to any one of the tenth to the thirteenth aspects.

In the bending sequence and bending die proposing method for the sheet metal part according to the present invention based on a fifteenth aspect, the bending sequence candidate display includes at least any one of the information representing the number of setup (number of arrangements), the number of inversion, or the number of rotations, and the information representing the total turning angle in the respective bending sequence candidates, in the respective being order candidates, in the method according to any one of the tenth to the fourteenth aspects.

In the bending sequence and bending die proposing method for the sheet metal part according to the present invention based on a sixteenth aspect, the bending sequence candidate display is displayed in order of the minimum number of stages, minimum number of inversion, or minimum number of rotations, in the method according to any one of the tenth to the fifteenth aspects.

According to the present invention, therefore, the bending sequence and the bending die for the sheet metal part having a bending portion can be optimally determined, adapted for a site in a bending factory, or in accordance with specific circumstances in the site.

BRIEF DESCRIPTION OF DRAWINGS

FIG. 6 shows one example of a priority condition display screen generated by priority condition display screen generation means included in the bending sequence and bending die proposing apparatus (see FIG. 5) and displayed on a display.

BEST MODE FOR CARRYING OUT THE INVENTION

The embodiment of the present invention will be described, with reference FIG. 1 to FIG. 11B.

Figure 1:
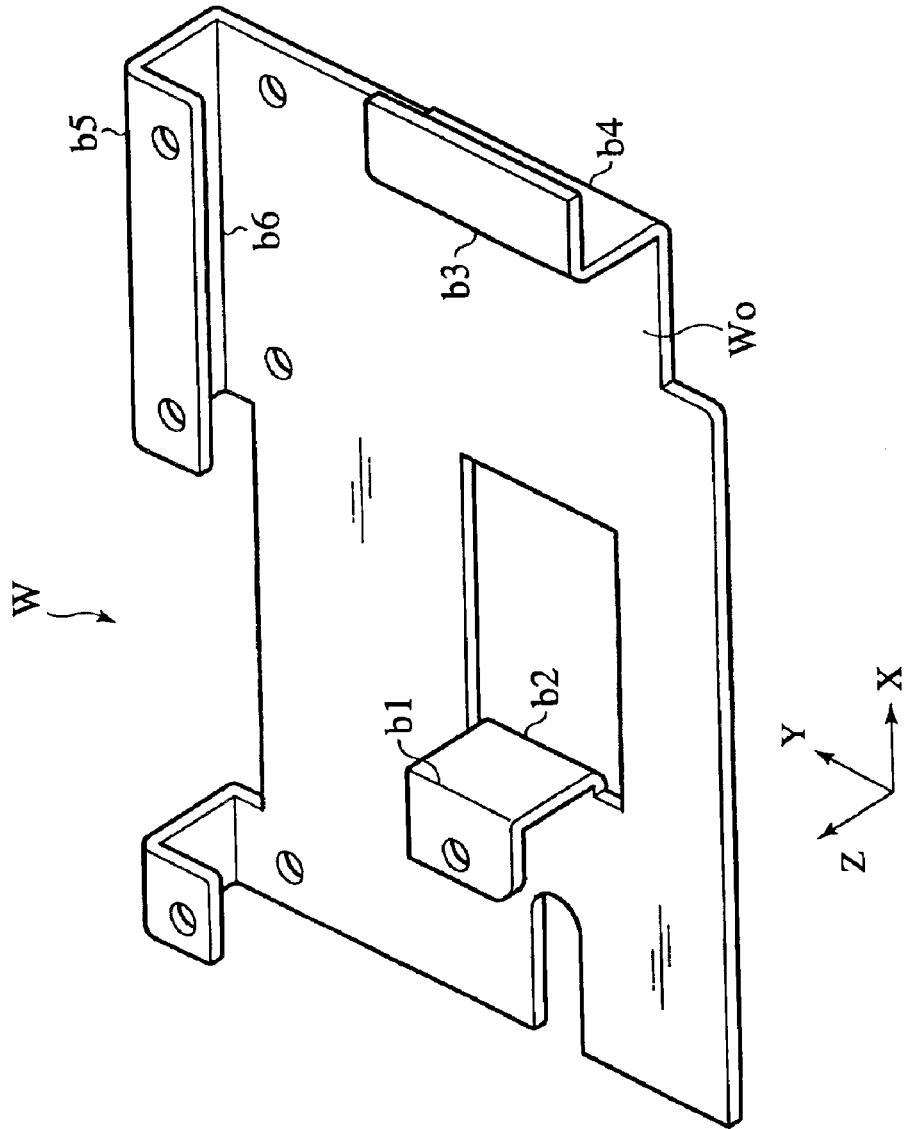
FIG. 1 is a three-dimensional view showing one example of a sheet metal part, to which the embodiment of the present invention is applied.

FIG. 1 shows one example of a three-dimensional diagram of a sheet metal part, to which this embodiment is applied. As shown in FIG. 1, the sheet metal part has many bending portions or bend lines. Therefore, it is necessary to determine in which order and by which tool these bend lines or bending portions are to be bent.

Figure 2:
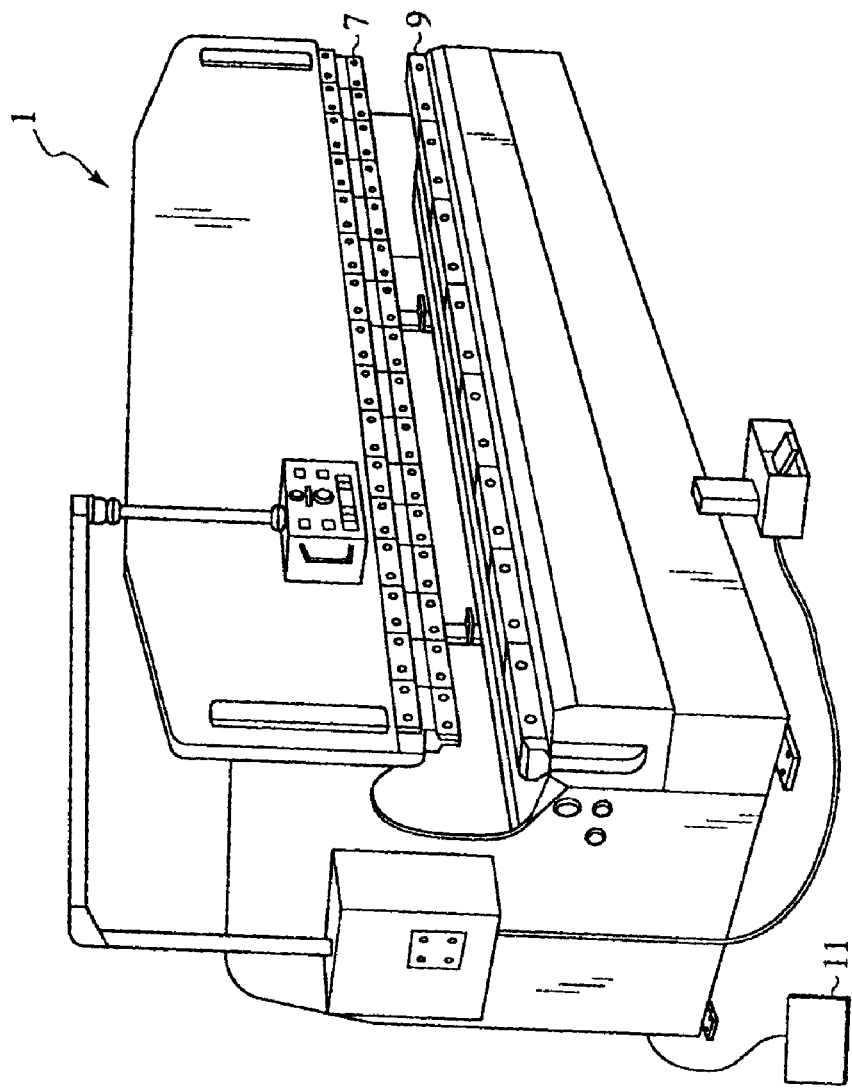
FIG. 2 shows one example of a press brake, which performs bending with respect to the sheet metal part in FIG. 1.
Figure 3:
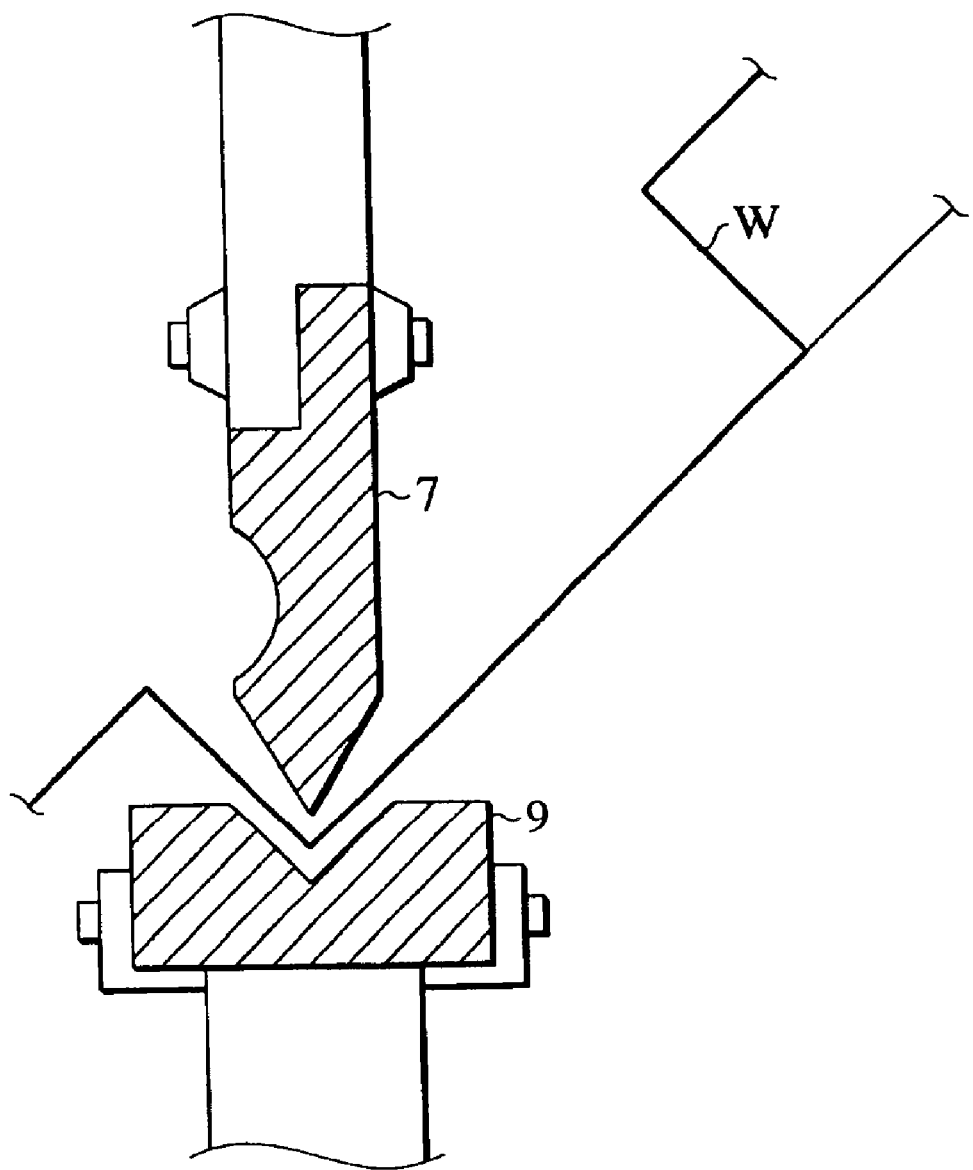
FIG. 3 is a sectional view showing an upper tool (punch) and a lower tool (die) mounted on the press brake.

FIG. 2 shows one example of a press brake 1, for bending a part W to be bent. As shown in FIG. 2 and FIG. 3, this press brake 1 comprises a punch 7 secured on a frame and a die 9 movable vertically with respect to the punch 7. Therefore, by inserting the part W between the punch 7 and the die 9, and bringing the die 9 close to the punch 7, bending of the part W can be performed.

As shown in FIG. 2, this press brake 1 is provided with a terminal 11 as a CAM apparatus. The embodiment of the bending sequence and bending die proposing apparatus of the present invention described later can be provided in this terminal 11. This terminal 11 is also provided with an input unit such as a keyboard and a mouse (not shown), and a display such as a CRT.

Figure 4:
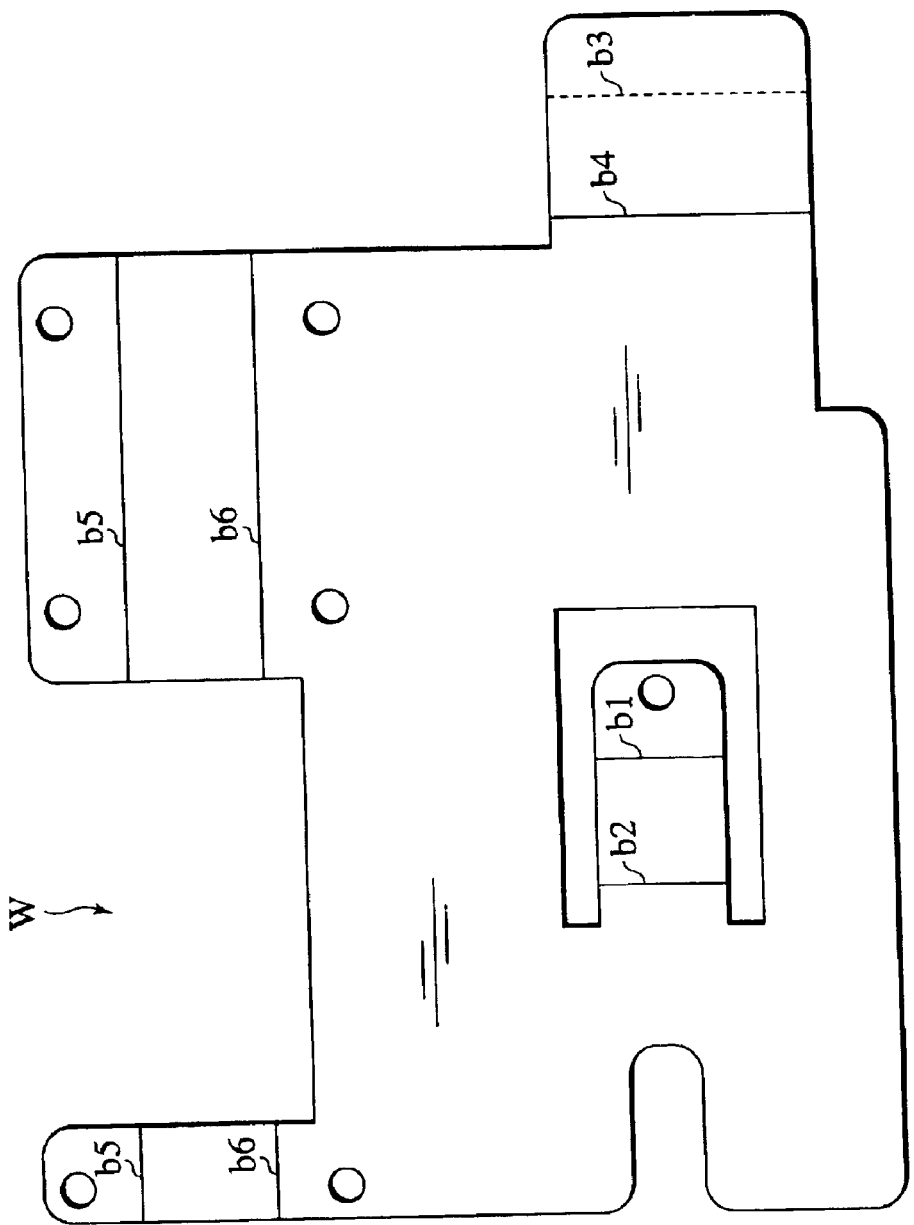
FIG. 4 is a development drawing of the sheet metal part in FIG. 1.

FIG. 4 shows a development drawing in the state that the sheet metal part W is developed at the respective bend lines and returned to the plane.

Figure 5:
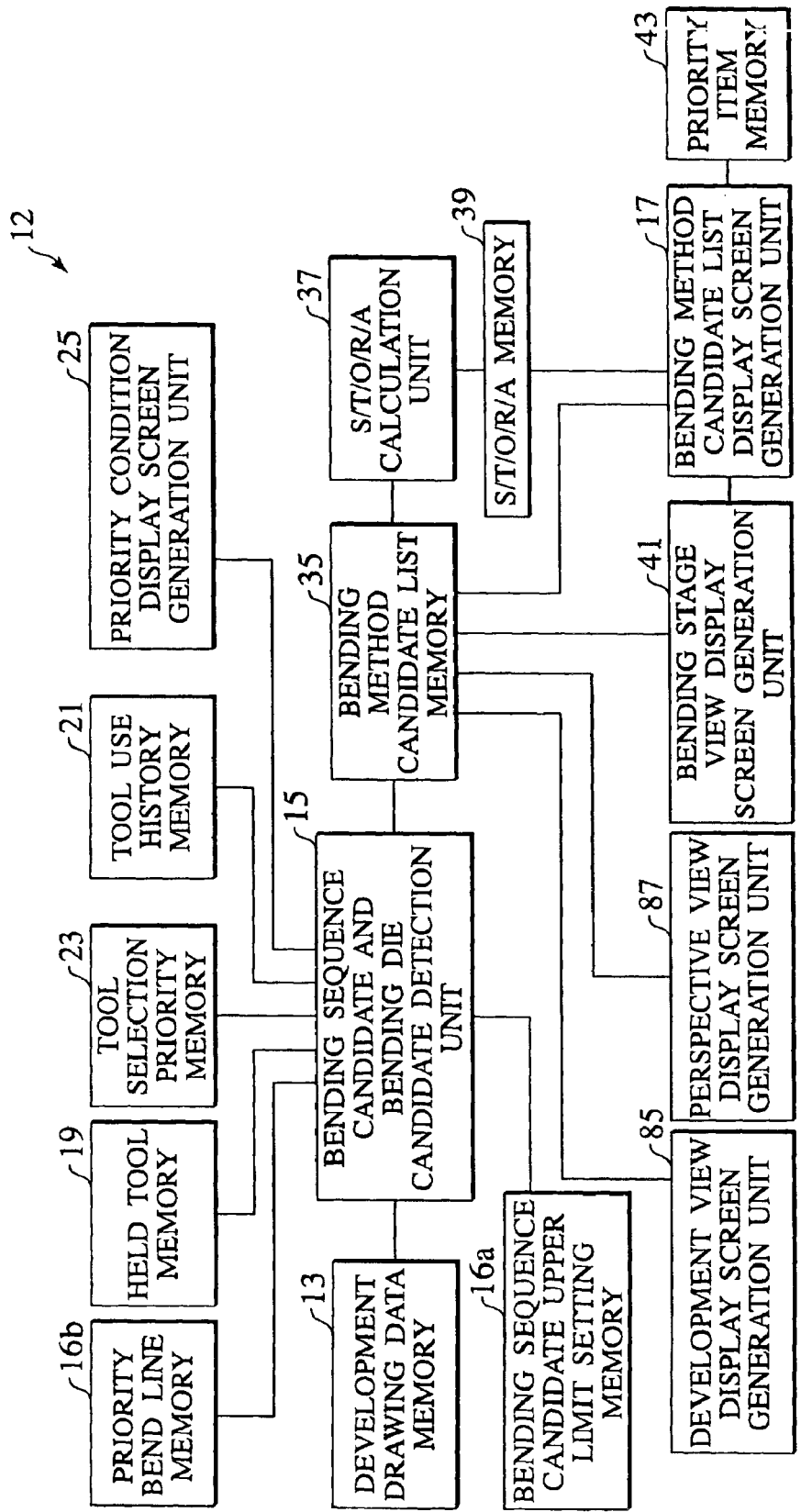
FIG. 5 is a block diagram showing one embodiment of a bending sequence and bending die proposing apparatus according to the present invention.

FIG. 5 is a block diagram showing one embodiment of the bending sequence and bending die proposing apparatus according to the present invention. As shown in FIG. 5, this embodiment includes a development drawing storing unit 13 for storing the development drawing of the sheet metal part, a unit 15 for detecting a plurality of bending sequence candidates capable of manufacturing the sheet metal part, and the bending die candidates to be used in the respective bending steps in the bending sequence candidates, and a bending method candidate list display screen generation unit 17 for displaying the plurality of bending sequence candidate list.

In the bending method candidate list display screen, there is a line 45c representing the number of stages in the respective bending sequence candidates. The apparatus also has a unit 19 for storing the held tools, and a unit 23 for storing the selection priority of the tool to be used.

The apparatus also has a unit 43 for storing a priority item. The priority item is at least one of the minimum number of stages, minimum number of inversion, and minimum number of rotations.

The detection of the bending sequence candidates and the bending die candidates is executed based on the information of held tools or priority information of the tool to be used.

Figure 8:
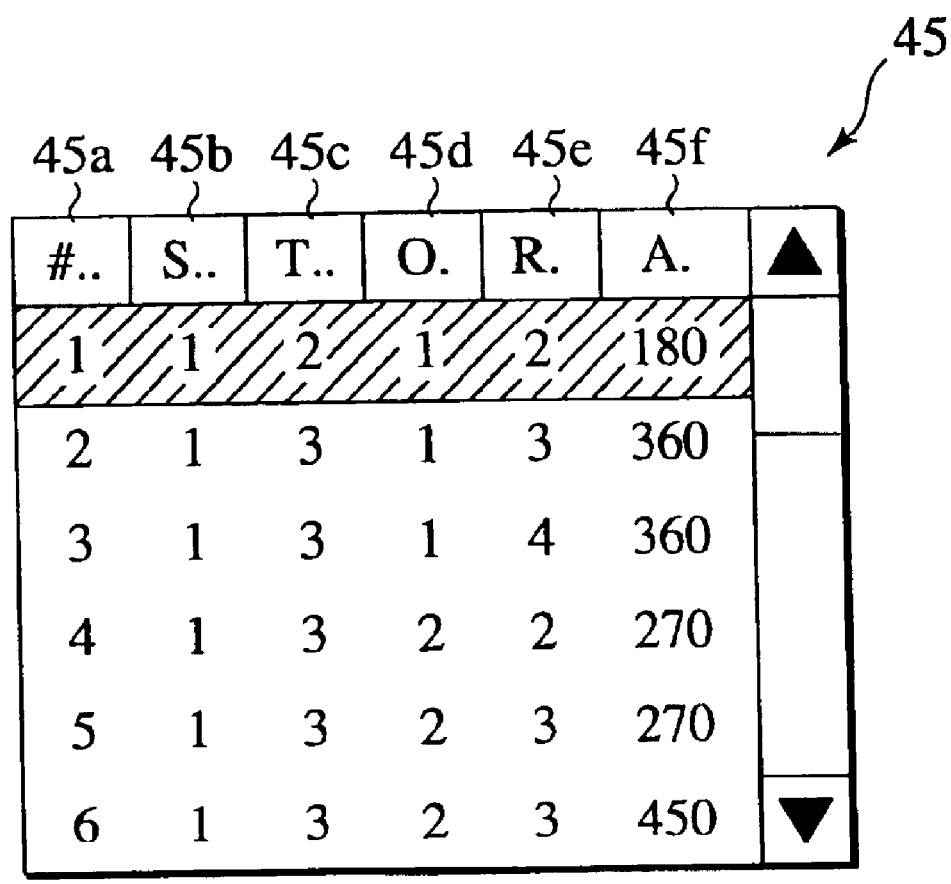
FIG. 8 is a partly enlarged diagram of FIG. 7.

The display 45 includes, as shown in FIG. 8, at least any one of the number of setup 45b (number of arrangements), the number of inversion 45d, information 45e representing the number of rotations, and the total turning angle 45f, in the respective bending sequence candidates.

The display 45 is displayed in order of the minimum number of stages, minimum number of inversion, or minimum number of rotations.

More specifically, the bending sequence and bending die proposing apparatus 12 provided in the CAM 11 comprises; a held tool memory 19 for storing tools held by a user who uses the press brake 1, a tool use history memory 21 for storing the tool use history 21 for storing the tool use history indicating the history of the tool used by the user, and a tool selection priority memory 23 for storing the selection priority of tools, when selecting the bending die for bending the part W.

The apparatus 12 further comprises a priority condition display screen generation unit 25 for generating the priority condition display screen including the held tools and the tool selection priority.

Figure 6:
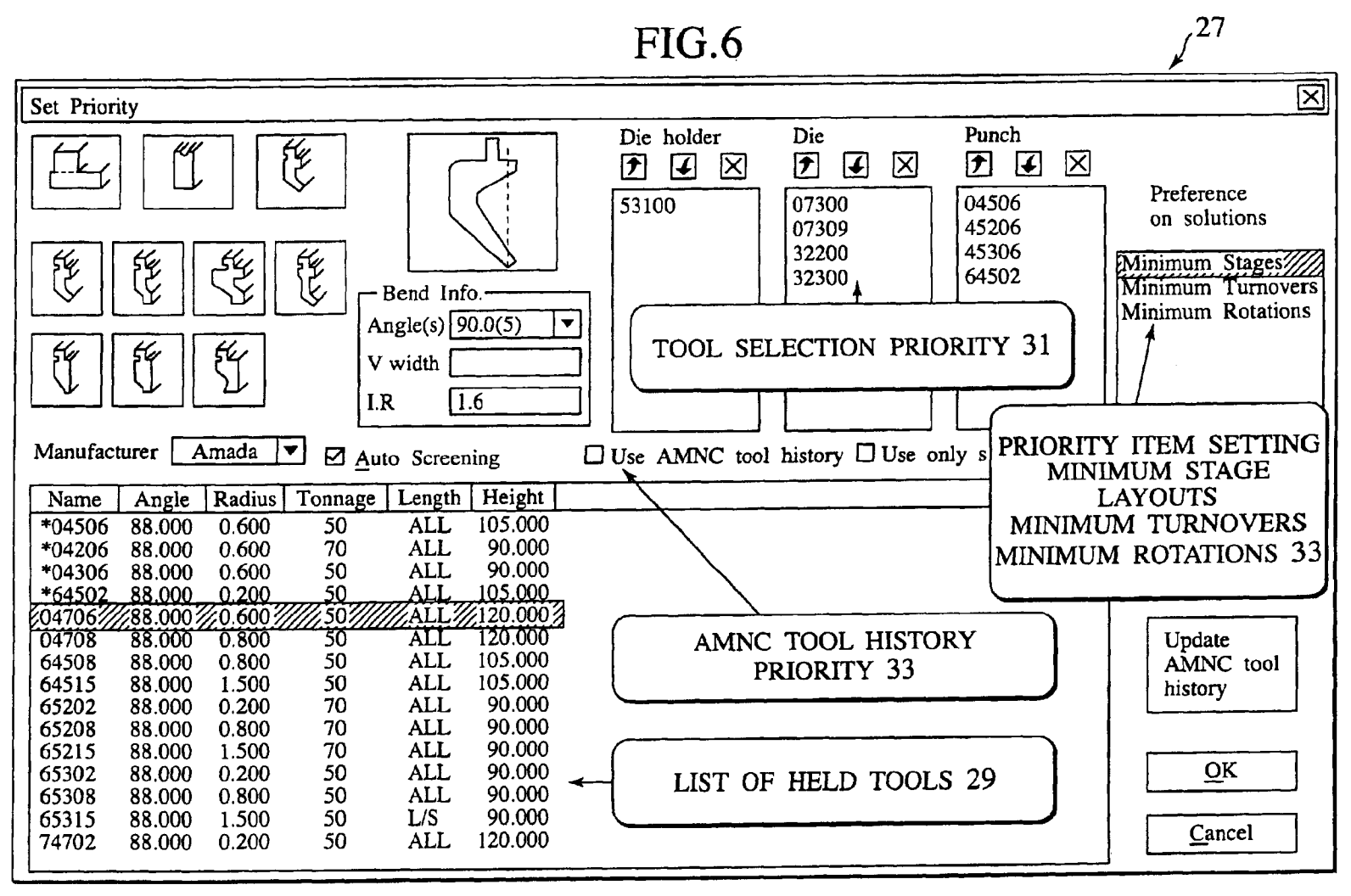

FIG. 6 shows a priority condition display screen 27 generated by the priority condition display screen generation unit 25. As shown in FIG. 6, this display screen 27 includes a list 29 of the tools held by the user, and a tool selection priority display column 31 indicating the priority when selecting the tool with respect to the respective bend lines.

The tool in this display column 31 can be sequentially selected manually from the held tools in the display column 29. Alternatively, the tool can be determined according to the use frequency based on the tool use history of the user, by selecting a box 33.

The tool in this display column 31 is checked if it can be used, at the time of selecting the bending die, in order of from the upper line. Thereby, it is checked whether the punch and tool can be used at the time of selecting the bending die for bending the sheet metal part W, (whether there is any interference with the workpiece), in order of from the tool located in the upper rank in the display column 31.

As shown in FIG. 6, the display screen 27 has a priority item setting display column 33, described later.

Referring to FIG. 5 again, the memories 19, 21 and 23, and the unit 25 are connected to the detection unit 15 connected to the memory 13.

Therefore, as described later, the detection unit 15 can detect the bending sequence candidates and the bending die candidates for bending the sheet metal part W based on the data from the memory 13 and the memory 23.

As shown in FIG. 5, the apparatus 11 further comprises a memory 35 for storing the bending sequence candidates and the bending die candidates detected by the detection unit 15.

As described above, the detection unit 15 detects a plurality of bending sequence candidates capable of bending the part W to be bent, and the bending die candidates in the respective bending sequence candidates. Therefore, the memory 35 stores the bending sequence candidates and the bending die candidates as a list.

The apparatus 12 further comprises a calculation unit 37 for calculating the number of arrangements S of the tool used in the respective bending sequences in the list, the number of stages T of the tool, and the number of turnovers O of the part W, and the number of rotations R of the sheet metal part W in a plane, and the cumulative turning angle A of the rotation in the plane of the part W, based on the information stored in the memory 35.

The number of arrangements S represents the number of replacement of the punch 7 and/or the die 9 during bending, when the punch 7 or the die 9 having a different height must be used, while bending the part W.

The number of stages T represents the number of stages of the punch and die (see 49a and 49b in FIG. 7) provided in a plurality of numbers along the lateral direction of the press brake 1, when the punch or the tool having a different shape (the height of the punch or die is the same) has to be used during bending the part W.

The number of turnovers O represents the number of turnovers of the main plane W0 (see FIG. 1), being the largest plane of the part W, during bending. That is, it represents the number of times when the part W is rotated by 180 degrees, about the axis X or Y (see FIG. 1) in the main plane W0.

The number of rotations R represents the number of rotations of the part W, about the axis Z orthogonal to the main plane W0, during bending. For example, if it is assumed that the part W must be rotated three times about the axis Z, for bending the part W, the number of rotations R becomes 3, and if it is necessary to rotate the part W four times, the number of rotations R becomes 4.

The cumulative turning angle A indicates the cumulative amount of rotation for rotating the part W, about the axis Z orthogonal to the main plane W0, during bending. For example, as described above, when it is necessary to rotate the part W three times about the axis Z, it is the cumulative angle of the turning angle for three times. For example, if it is necessary to rotate the part W by 90 degrees for the first time, by 90 degrees for the second time, and by 180 degrees for the third time, the cumulative turning angle A becomes 360 degrees.

Referring again to FIG. 5, the apparatus 12 further has a memory 39 for storing the respective data S, T, O, R, and A. Further, the apparatus 12 has a bending sequence and bending die candidate list display screen generation unit 17 for generating a bending sequence and bending die candidate list display screen according to data or information from the memory 35.

Figure 7:
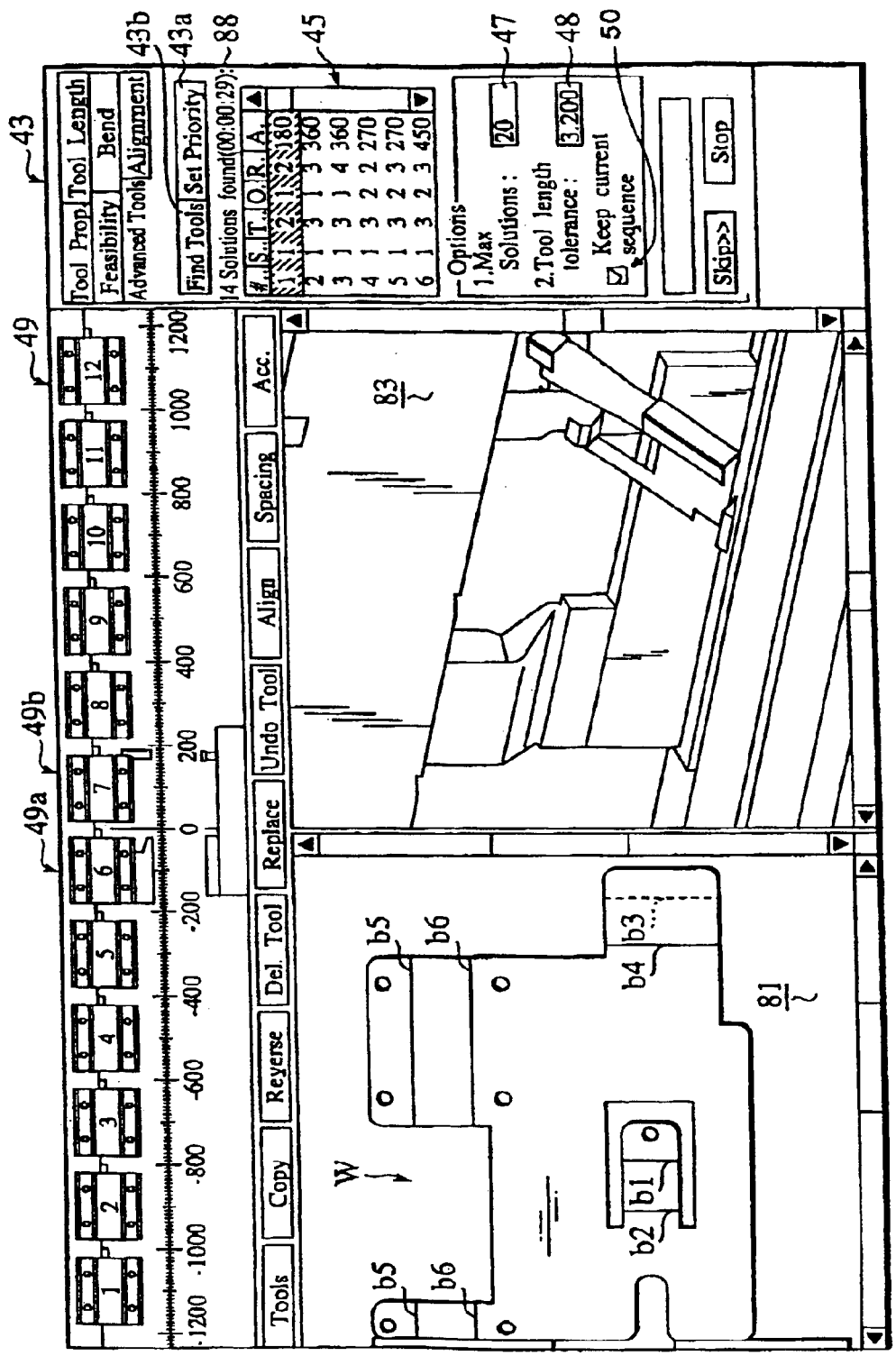
FIG. 7 shows one example of a bending sequence and bending die candidate list display screen generated by bending sequence and bending die candidate list generation means.

FIG. 7 shows one example of a bending sequence and bending die candidate list display screen 45 generated by the bending sequence and bending die candidate list generation unit 17. As shown in FIG. 7, in this embodiment, the display screen 45 is displayed on a display in the CAM 11, as a part of the information and data input/output screen 43.

FIG. 8 shows an enlarged view of the list screen 45. As shown in FIG. 8, this list screen 45 includes a column 45a for list number, a column 45b for number of arrangements, a column 45c for number of stages, a column 45d for number of turnovers, a column 45e for number of rotations, and a column 45f for cumulative turning angle.

As shown in FIG. 5, the apparatus 11 has a priority item memory 43 that sets the priority item for setting the display order of the banding order candidates, when displaying the list screen 45 of the bending sequence candidates or bending die candidates by the display screen generation unit 17. The priority item stored in this memory 43 is displayed on the display column 33 in FIG. 6.

For example, as shown in the display column 33, when the minimum number of stage layouts T, minimum number of inversion (turnovers) O, and minimum number of rotations R are to be set as the priority items, the plurality of bending sequence candidates (list) is arranged on the screen 45 in order of the minimum number of stage layouts T, minimum number of inversion (turnovers) O, and minimum number of rotations R. In the display column 45 in FIG. 7 and FIG. 8, six bending sequence candidates are displayed in order of the minimum number of stage layout T, minimum number of inversion (turnovers) O, and minimum number of rotations R, as described above.

Normally, with an increase in the number of stage layouts T, the workpiece schedule of the operator at the setting stage increases. With an increase in the number of inversion of the workpiece, the load of the operator increases. With an increase in the number of rotations R, the workpieceload of the operator also increases. Therefore, by displaying the bending sequence candidates in order of the priority items, the user can easily detect the bending sequence candidate having a low workpieceload from a plurality of bending sequence candidates on the display 45.

By displaying the number of arrangements S, the number of stages T, the number of turnovers O, the number of rotations R, and the cumulative turning angle A on the candidate display screen 45, the user can understand the bending sequence candidate, which is considered to be most suitable in the factory, of a plurality of bending sequence candidates displayed on the screen 45 (1 to 6 are displayed in FIG. 7).

Referring to FIG. 5 again, the apparatus 12 is provided with a bending stage view display screen generation unit 41 for generating the bending stage view display screen.

The screen 49 in FIG. 7 shows a bending stage view generated by the bending stage view display screen generation unit 41. As shown in FIG. 7, in this example, the bending stage includes a first stage 49a and a second stage 49b.

In this embodiment, a view of a bending stage in the bending sequence candidates in which white and black of letters are inverted is displayed, at which a cursor is located on the display screen 45. Therefore, the operator or the user can easily check whether the bending stage in the selected bending sequence candidate is suited for the workpiece environment in the own factory, by referring to this view 49.

In this example, as described above, only the stage view 49 of the selected bending sequence candidate is displayed on the screen 45. However, for example, it can be changed to display all stage views of, for example, six bending sequence candidates displayed on the display 45 at the same time. Alternatively, it can be constructed such that all stage views of the detected all bending sequence candidates can be scanned regardless of the display on the display screen 45.

As a result, the number of stages in the respective bending sequence candidates, which occupy a large portion in the workpieceload in the bending operation, can be compared with each other to perform judgment.

Referring to FIG. 5 again, the apparatus 12 is provided with a bending sequence candidate upper limit number setting memory 16a. By the upper limit of the bending sequence candidates stored in this memory 16a, the upper limit of the bending sequence candidates to be detected is set, at the time of detecting the bending sequence candidates and the bending die candidates by the detection unit 15.

As shown in FIG. 7, an upper limit setting column 47 for inputting the upper limit is provided on the screen 43. Further, as shown in FIG. 7, a tool length tolerance setting column 48 for setting how much difference is allowed when the length of the bending die is shorter than the length of the bend line, at the time of detecting the bending sequence and bending die candidates by the detection unit 15 is provided on the screen 43. The apparatus 12 is also provided with a memory for storing the tool length tolerance set value (not shown).

As shown in FIG. 7, furthermore, there is provided on the screen 43 a bending sequence fixing button 50 for fixing the bending sequence of a certain bend line beforehand, at the time of detecting the bending sequence of the bend lines b1 to b6 and the bending die by the unit 15.

As shown in FIG. 7, a priority condition setting button 43a and a search start button 43b are also provided on the screen 43. The priority condition setting button 43a is a button for displaying the screen 27 shown in FIG. 6 to set the priority condition by using this screen.

As shown in FIG. 7, the display screen 43 includes a development view 81 indicating the development drawing of the part W as the workpiece, and a perspective view 83 indicating the bending perspective drawing during bending. These views 81 and 83 are respectively generated by a development view display screen generation unit 85 and a perspective view display screen generation unit 87 included in the apparatus 11.

Referring to FIG. 5 again, the apparatus 12 is provided with a priority bend line memory 16b for setting a bend line or bend point to be bent preferentially, at the time of detecting the bending sequence candidates or the bending die candidates for bending the part W. For example in FIG. 4, it is set as a priority condition to bend the bend lines b1 and b2 of a cut and raised portion first. Further, it is also set as the priority conditions that the bend line b3 is bent first than the bend line b4, and the bend line b5 is bent first than the bend line b6.

As a result, when the bending sequence candidates or the bending die candidates are detected by the detection unit 15, the bending sequence capable of bending can be detected easily and quickly.

Figure 9:
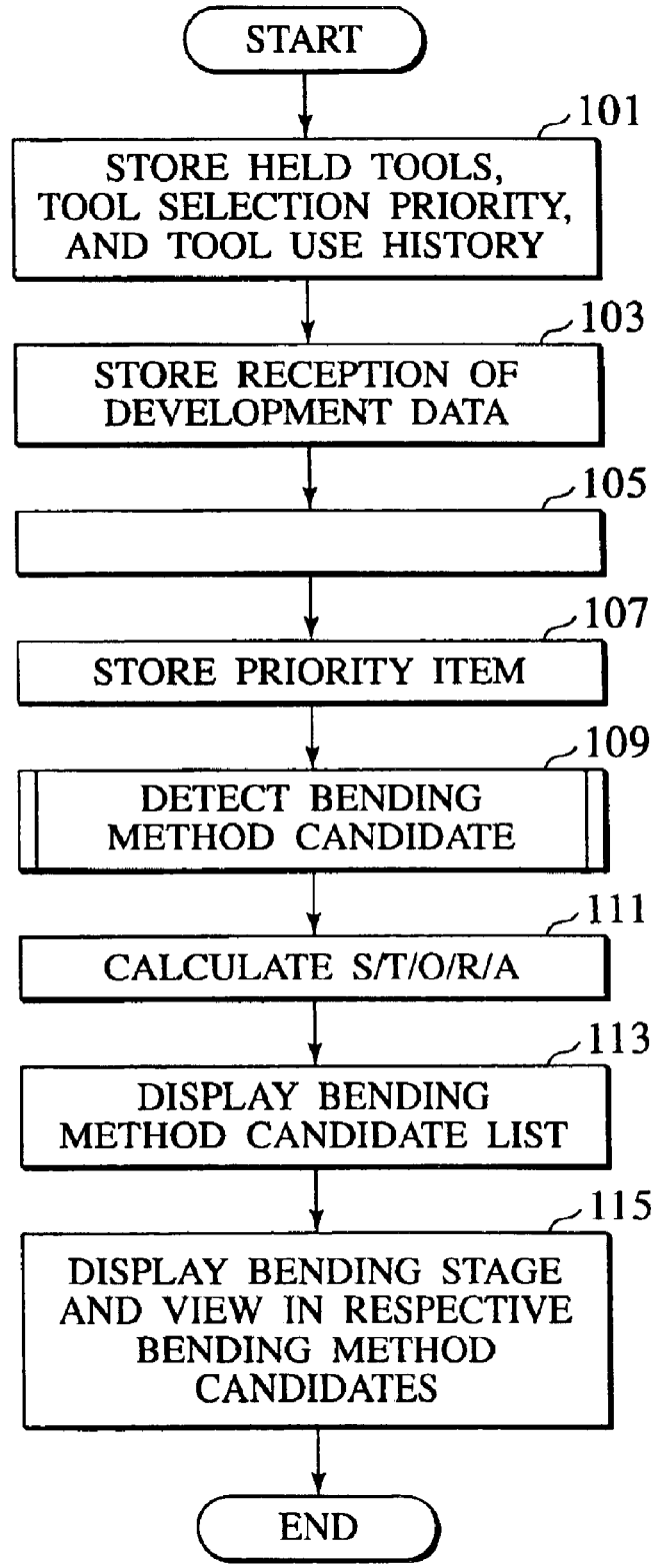
FIG. 9 is a flowchart showing a bending sequence and bending die proposing method according to the present invention.

FIG. 9 shows a method for detecting the bending sequence and bending die candidates, by using the apparatus 12.

At step 101, the held tools, the tool selection priority and the tool use history are stored in the memories 19, 23 and 21.

At step 103, the development data of the part W is received from the CAD or the like and stored.

At step 105, the priority bend line number to be bent preferentially, and the maximum number of the bending sequence candidates to be detected are set and stored.

At step 107, the priority item (see column 33 in FIG. 6) defining the display order of the detected bending sequence candidates is set and stored.

At step 109, based on the development drawing, the held tools, the tool selection priority, the tool use history, the priority bend line number, and the maximum number of the bending sequence candidates to be detected, the bending sequence candidates and the bending die candidates are sequentially detected.

At step 111, the number of arrangements S of the tool, the number of stages T of the tool, the number of turnovers O of the part W, the number of rotations R of the sheet metal part W in a plane, and the cumulative turning angle A of the rotation in the plane of the part W, in the respective bending sequence candidates are calculated.

At step 113, the bending sequence candidates and the bending die candidates are displayed as shown on the screen 45 in FIG. 7, based on the results at steps 109 and 111.

At step 115, the view of the bending stage in the respective bending sequence candidates is displayed as shown by screen number 49 in FIG. 7.

Figure 10:
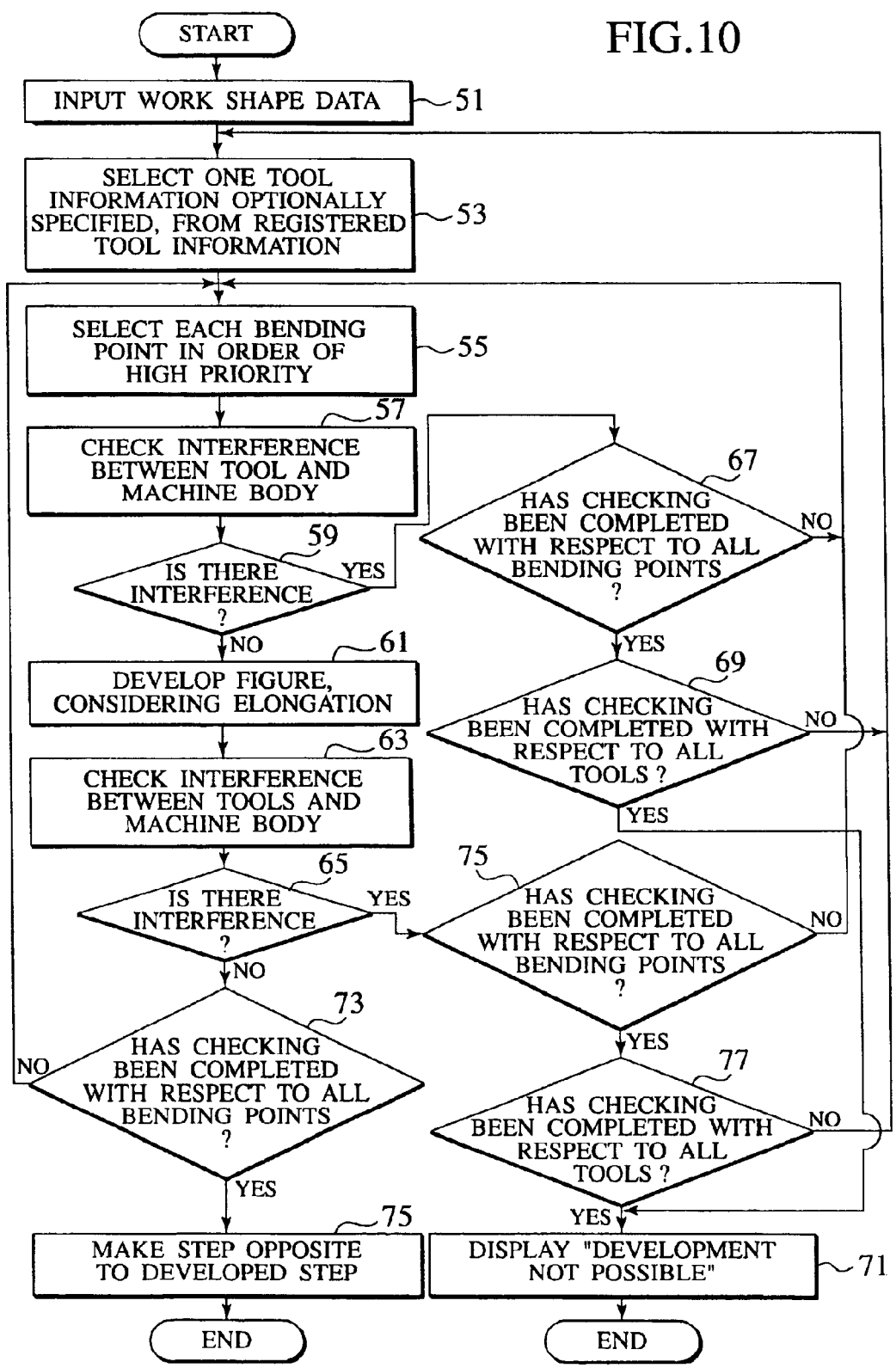
FIG. 10 shows more detailed configuration of the bending sequence and bending die detection step executed in FIG. 9.

FIG. 10 and FIG. 11 show the detection method of the bending sequence candidates and the bending die candidates at step 109.

At first, data of final workpiece shape (three dimensional shape) of the workpiece is input to the CAM apparatus 12 (step 51). From various tools that can be used in the bending machine, one tool is specified (see column 31), and the tool data is read (step 53). It is also possible to select the tool information by specifying one that the operator thinks to be suitable.

In this manner, the final workpiece shape data of the workpiece is input (specified), and optional one tool is specified. Subsequently, development at the respective bend lines of the workpiece is sequentially performed. Here, temporary development sequence from the workpiece having the final workpiece shape until it becomes the workpiece before bending is set corresponding to the bend lines, based on the input final workpiece shape data. For example, development can be started sequentially from a bend line located at one end of the workpiece, or development can be started from a bend line at the center. Therefore, priority is given to the respective bend lines, taking the following requirements into consideration, to specify a temporary development sequence beforehand, and the respective bend lines are sequentially developed according to the temporary development sequence. This determination of priority may be uniquely made by the CAM apparatus, or the operator may input the priority (see memory 16b) (step 55).

The determination requirements of the priority for developing the steps include that the number of rotations of the workpiece is small, and that a special shape, for example, FR bending, hemming, hat, slanting flange and the like, or an important shape are given priority, based on the final workpiece shape data. Information relating to a bend line whose development is obviously impossible is also taken into consideration.

In FIG. 4, for example, it is set as a priority to bend the bend lines b1 and b2 in the cut and raised portion first. It is also set as a priority to bend the bend line b3 first than the bend line b4, and to bend the bend line b5 first than the bend line b6.

Figure 11A:
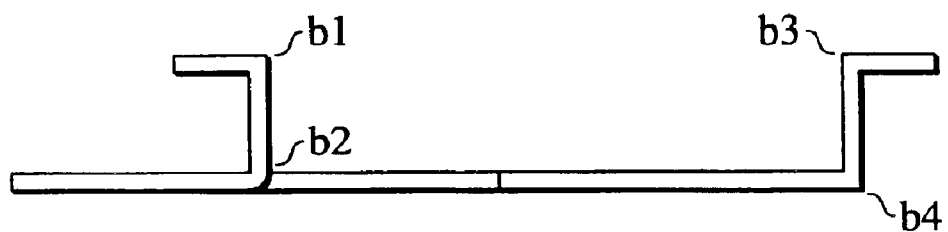
FIGS. 11A and 11B are diagrams showing a bend line development step executed in FIG. 10.
Figure 11B:
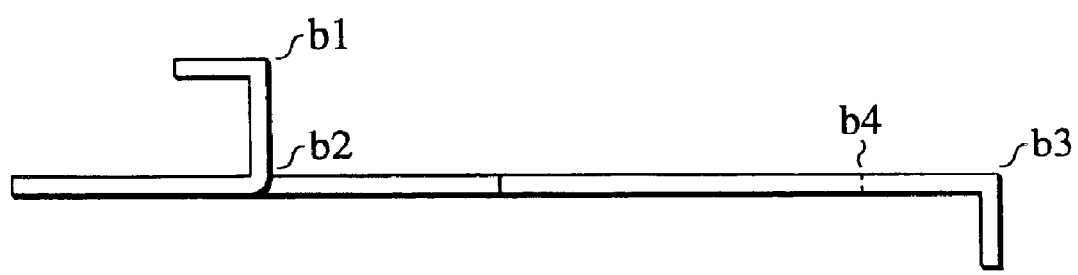

According to the temporary development sequence, the workpiece and the tool at the time of bending the corresponding bend lines are combined, and the workpiece W is developed based on the corresponding bend lines, to thereby judge whether there is any interference between the workpiece W and the tool (the punch 7 and the die 9), before and after bending the corresponding bendlines. For example, if the development of a workpiece having the final workpiece shape shown in FIG. 1 is considered by the CAM apparatus, for example, it is determined to start development of the bend line b4. Therefore, as shown in FIG. 11A, the workpiece W and the tool 7, 9 are combined, after bending the bend line b4, to judge the existence of interference between the workpiece W and the tool 7, 9 by the CAM apparatus (steps 57, 59). In this judgment of the existence of interference, when it is judged that the workpiece W after bending does not interfere with the tool 7, 9 and the machine, as shown in FIG. 11B, this bend line b4 is developed based on the bend line b4. It is then judged if any interference between the tools and the machine body back gauge and other parts occurs, by the CAM apparatus after the development (steps 61 to 65).

When it is judged at step 59 that there will be interference between the tools and the machine body at the bend line b4 before the development thereof, the temporary development sequence is changed such that the bend line b4 is bent later, and other bend lines, for example, the bend line b6 is to be bent, and the flow at steps 55 and 59 is repeated for the newly specified bend line. It is then judged again if any interference between the tools and the machine body occurs with respect to the newly set bend line, before the development thereof (step 67).

And finally, the bend line at which no interference occurs is extracted, and the development from step 61 onwards is performed with respect to the bend line at which no interference occurs.

At step 67, when the existence of interference is judged with respect to all bendlines, and if there is still interference, it is judged that the tool specified first is not suitable, and another tool is specified. The workpiece from step 53 onwards is developed with respect to the newly specified tool, to judge if there is any interference between the tool 7, 9 and the machine body (step 69).

At step 69, when the workpiece W is developed with respect to all tool 7, 9, and if it is judged that there is still interference, it is judged that development is not possible for the workpiece, and "development not possible" is displayed, to finish the flow (step 71).

In the judgment of the existence of interference between the workpiece W and the tool 7, 9 after the development at the specified bend line b4 at step 65, if it is judged that there will be no interference, it is judged that bend line is suitable, and with respect to the other bend line, for example, the bend line b3, the flow from step 55 is newly started (step 73).

In the judgment of interference between the tool 7, 9 and the machine body in the state with the bend line b4 developed at step 65, if it is judged that there is interference, it is judged that development at this bend line b4 is not suitable, and the temporary development sequence is changed in the same manner as at step 67, and it is judged if there is interference between the workpiece W, the tool 7, 9, and the machine body, before and after the development, with respect to the other bend lines, to thereby extract a bend line having no interference (step 75). When the existence of interference is judged with respect to all bend lines, and if it is judged that there is still interference, it is judged that the selected tool 7, 9 is not suitable, in the same manner as at step 69, and another tool is specified. The flow from step 55 onwards is developed with respect to the newly specified tool 7, 9, to judge if there is any interference between the tool 7, 9 and the machine body at the respective bend lines.

Even if judgment for interference is performed with respect to all tool 7, 9, it is judged that there is still interference, then it is judged that there is no suitable tool 7, 9 for bending the workpiece to be bent, and it is displayed that development is not possible (step 71).

At step 73, if it is judged that development at the first bend line b4 is possible without causing interference, and when development is performed at the next bend line b5, and the existence of interference is judged, then judgment is performed with respect to other bend lines, for example, bend lines b6 and b5, sequentially. And finally, development is performed until the workpiece W becomes a complete planar state. When development up to this planar state is completed, it is judged that the temporary development sequence is the one that can be performed without causing any interference between the workpiece W, the tool 7, 9, and the machine body. Therefore, a sequence quite opposite to the development sequence having no interference is set, and determined as the bending sequence of the workpiece W (step 75).

In this manner, development is performed sequentially from a bend line having high priority, and the existence of interference between the tool and the machine body is judged before and after the development of the workpiece W, to extract the development sequence having no interference, and the opposite sequence to the development sequence is determined as the bending sequence.

According to this embodiment, a user or an operator can easily select the bending sequence suitable in the own factory or for the press brake or tools held therein, and the bending die (including the bending die stage) in the bending sequence, by sequentially referring to the bending sequence candidates or the bending die candidates displayed on the screens 45 and 49.

The present invention is not limited to the embodiment described above, and by adding appropriate changes, the present invention can be executed in other modes.

What is claimed is:

1. A bending sequence and bending die proposing apparatus for a sheet metal part, comprising:
   a memory that stores a development drawing of the sheet metal part;
   a detector that detects a plurality of bending sequence candidates, capable of manufacturing the sheet metal part, and bending die candidates, to be used in bending in the respective bending sequence candidates, based on the development drawing; and
   a display that displays the plurality of bending sequence candidates, wherein the display displays information representing the number of stages in the respective bending sequence candidates.

2. A bending sequence and bending die proposing apparatus for the sheet metal part according to claim 1, further comprising:
   a storage that stores tools.

3. A bending sequence and bending die proposing apparatus for the sheet metal part according to claim 1, further comprising:
   a storage that stores selection priority of a tool to be used.

4. A bending sequence and bending die proposing apparatus for the sheet metal part according to claim 1, further comprising:
   a storage that stores a priority item.

5. A bending sequence and bending die proposing apparatus for the sheet metal part according to claim 4, wherein the priority item is one of the minimum number of stages, minimum number of inversions, and minimum number of rotations.

6. A bending sequence and bending die proposing apparatus for the sheet metal part according to claim 2, wherein the detection of the bending sequence candidates and the bending die candidates is executed based on the information of one of tools and priority information of a tool to be used.

7. A bending sequence and bending die proposing apparatus for the sheet metal part according to claim 1, wherein the display includes at least one of the information representing the number of setup arrangements, the number of inversions, and the number of rotations, in the respective bending sequence candidates.

8. A bending sequence and bending die proposing apparatus for the sheet metal part according to claim 7, wherein the display includes information representing the total turning angle in the respective bending sequence candidates.

9. A bending sequence and bending die proposing apparatus for the sheet metal part according to claim 5, wherein the display is displayed in order of one of the minimum number of stages, minimum number of turnovers and minimum number of rotations.

10. A bending sequence and bending die proposing method for a sheet metal part, comprising:
    receiving a development drawing of the sheet metal part;
    detecting a plurality of bending sequence candidates, capable of manufacturing the sheet metal part, and bending die candidates, to be used in bending in the respective bending sequence candidates, based on the development drawing; and
    displaying the plurality of bending sequence candidates, wherein the display includes information representing the number of stages in the respective bending sequence candidates.

11. A bending sequence and bending die proposing method for the sheet metal part according to claim 10, further comprising:
    storing tools.

12. A bending sequence and bending die proposing method for the sheet metal part according to claim 10, further comprising:
    storing selection priority of a tool to be used.

13. A bending sequence and bending die proposing method for the sheet metal part according to claim 10, further comprising:
    storing one of priority items of the minimum number of stages, minimum number of inversions, and minimum number of rotations.

14. A bending sequence and bending die proposing method for the sheet metal part according to claim 10, wherein the detection of the bending sequence candidates and the bending die candidates is executed based on one of the information of tools and selection priority information of a tool to be used.

15. A bending sequence and bending die proposing method for the sheet metal part according to claim 10, wherein the bending sequence candidate display includes at least one of information representing the number of setup arrangements, the number of turnovers and the number of rotations, and information representing the total turning angle in the respective bending sequence candidates.

16. A bending sequence and bending die proposing method for the sheet metal part according to claim 10, wherein the bending sequence candidate display is displayed in order of one of the minimum number of stages, minimum number of turnovers and minimum number of rotations.

17. A bending sequence and bending die proposing apparatus for the sheet metal part according to claim 2, wherein the detection of the bending sequence candidates and the bending die candidates is executed based on the information of one of tools and priority information of a tool to be used.

* * * * *